US008554629B2

(12) United States Patent
Barton et al.

(10) Patent No.: US 8,554,629 B2
(45) Date of Patent: Oct. 8, 2013

(54) TARGETED ADS BASED ON USER PURCHASES

(75) Inventors: Chris Barton, San Francisco, CA (US); Prem Ramaswami, Neshanic Station, NJ (US)

(73) Assignee: Google Inc., Mountain View, CA (US)

( * ) Notice: Subject to any disclaimer, the term of this patent is extended or adjusted under 35 U.S.C. 154(b) by 604 days.

(21) Appl. No.: 12/019,927

(22) Filed: Jan. 25, 2008

(65) Prior Publication Data
US 2009/0192888 A1 Jul. 30, 2009

(51) Int. Cl.
*G06Q 40/00* (2012.01)
(52) U.S. Cl.
USPC .................................................. 705/14.73
(58) Field of Classification Search
USPC .......................................................... 705/14
See application file for complete search history.

(56) References Cited

U.S. PATENT DOCUMENTS

| | | | |
|---|---|---|---|
| 5,754,939 A | 5/1998 | Herz et al. | |
| 6,782,370 B1 | 8/2004 | Stack | |
| 7,693,750 B2 * | 4/2010 | Christensen | 705/14.1 |
| 2003/0225632 A1 * | 12/2003 | Tong et al. | 705/27 |
| 2006/0235764 A1 * | 10/2006 | Bamborough et al. | 705/26 |
| 2007/0061197 A1 * | 3/2007 | Ramer et al. | 705/14 |
| 2010/0205045 A1 * | 8/2010 | Zhang et al. | 705/10 |

OTHER PUBLICATIONS

Patents.com: Exclusive for e-commerce: McCoy, Michael D. The Computer Lawyer 16. 12 (Dec. 1999): 10-16.*
Designing effective cyber store user interface: Kim, Eyon ; Eom, Sean B. Industrial management +Data Systems 102. 5/6 (2002): 241.*
The persuasive power of design elements on an e-commerce Web site: Winn, Wendy; Beck, Kati. Technical Communication 49. 1 (Feb. 2002): 17-35.*

* cited by examiner

*Primary Examiner* — Hani M Kazimi
*Assistant Examiner* — Hatem M Ali
(74) *Attorney, Agent, or Firm* — Sterne, Kessler, Goldstein & Fox P.L.L.C.

(57) ABSTRACT

The present invention relates to systems and methods for providing advertisements on websites. In an embodiment, a method for providing an advertisement on a website includes obtaining purchase information submitted by a user making a purchase on the website, determining at least one advertisement for a product or service related to the purchase but of a different type than the purchase, and displaying the at least one advertisement on the website when the purchase is completed. In another embodiment, a system for providing an advertisement on a website includes a purchase server, an advertisement source, an analyzer, and an advertisement server.

24 Claims, 5 Drawing Sheets

FIG. 4

Order Details NiceGuyTravelBooks.com Nice Guy Ln NY, NY 10018 US — 400 joephilanthropist@gmail.com | Help | Sign out

Edit order — 402

| Qty | Item | Price |
|---|---|---|
| 1 | "Lonely Planet India" | $29.99 |

Shipping  [Ground ($3.00) ▼]  :  $3.00

Tax:  $0.00

Total: $32.99

Pay with: VISA xxx-1234  Change

Ship to: Joe Philanthropist  Change
1000 Charity Lane
Sunny View, CA  95555
United States

[ Place your order now - $32.99 ] — 404

TARGETED ADS BASED ON USER PURCHASES

BACKGROUND

1. Field of the Invention

The present invention relates to targeted advertisements.

2. Background Art

Targeting an advertisement to a desired audience often increases the likelihood that the advertisement will be successful in generating commercial activity for the advertiser. Advertisers wish to place their advertisement at the time and place where a potential customer would be most interested in making a purchase from the advertising retailer. Websites often carry advertisements to target potential customers who are visiting a website. Such visitors often select products to learn more about the product. They may even place the products in their virtual shopping cart. Sometimes users may just be browsing and may exit the website before proceeding to checkout. An advertiser may wish to spend its money on a more committed audience.

A more desirable audience is a user that is confirming a purchase being made on the website. At this point, the user has already made a decision to spend money for a good or service. It is at this fleeting moment that the user has provided valuable information and may or may not be aware of other products and services that are highly relevant. Unfortunately, third-party advertisers of products relevant to the completed purchase have not had a chance to display advertisements to the user at this opportune time.

Some existing systems utilize collaborative filtering to display similar items at a time of purchase. That is, when a user selects an item for the user's shopping cart, the user may be shown similar products purchased by other users who have purchased the same product currently selected by the user. However, these offered items are merely other items of the same type or category. For instance, if a user purchases a book, the user is shown other books, not services related to the book's content. Collaborative filtering is often used to determine products of similar interest in the same type or category, but there are two limitations to existing collaborative filtering. First, collaborative filtering is typically employed by the web site using a database of its own inventory of goods rather than a database of third party advertisers. Second, collaborative filtering typically identifies products with similar qualities rather than products which logically would be attractive given the purchase of a particular product. Furthermore, the displayed products shown that have been purchased by other users, as described above, are neither sourced as a "paid for placement" advertisement nor are offered at the time a user has acted on a decision to purchase.

SUMMARY

The present invention relates to systems and methods for providing advertisements on websites. In an embodiment, a method for providing an advertisement on a website is provided. The method includes obtaining purchase information submitted by a user making a purchase on the website. The purchase information can be used to determine at least one advertisement for a product or service related to the purchase but of a different type than the purchase. In an example, the at least one advertisement is displayed on the website when the purchase is completed.

In another embodiment, a system for providing an advertisement on a website is provided. The system includes a purchase server that obtains purchase information submitted by a user making a purchase on the website, an advertisement source, and an analyzer that determines at least one advertisement for a product or service based upon the purchase information. In an example, the system includes an advertisement server that serves at least one advertisement from the advertisement source for display on the website when the purchase is completed.

Further embodiments, features, and advantages of the invention, as well as the structure and operation of the various embodiments of the invention are described in detail below with reference to accompanying drawings.

BRIEF DESCRIPTION OF THE FIGURES

Embodiments of the invention are described with reference to the accompanying drawings. In the drawings, like reference numbers may indicate identical or functionally similar elements. The drawing in which an element first appears is generally indicated by the left-most digit in the corresponding reference number.

FIGS. 4-5 illustrate browser views, according to an embodiment of the present invention.

DETAILED DESCRIPTION OF THE INVENTION

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

Embodiments described herein refer to advertisements being provided on a website. In providing an advertisement for a website, an advertisement server typically may choose from a variety of advertisements stored in an advertisement source. Advertisements, as described herein, refer to any type of advertisement that may be displayed while a user is visiting a website. For example and without limitation, an advertisement may be a text advertisement, an image advertisement, a video advertisement, an audio advertisement, a multimedia advertisement, or an interactive advertisement. A user may be a human or a computer. A user may also be a shopper or consumer.

Figure 1:
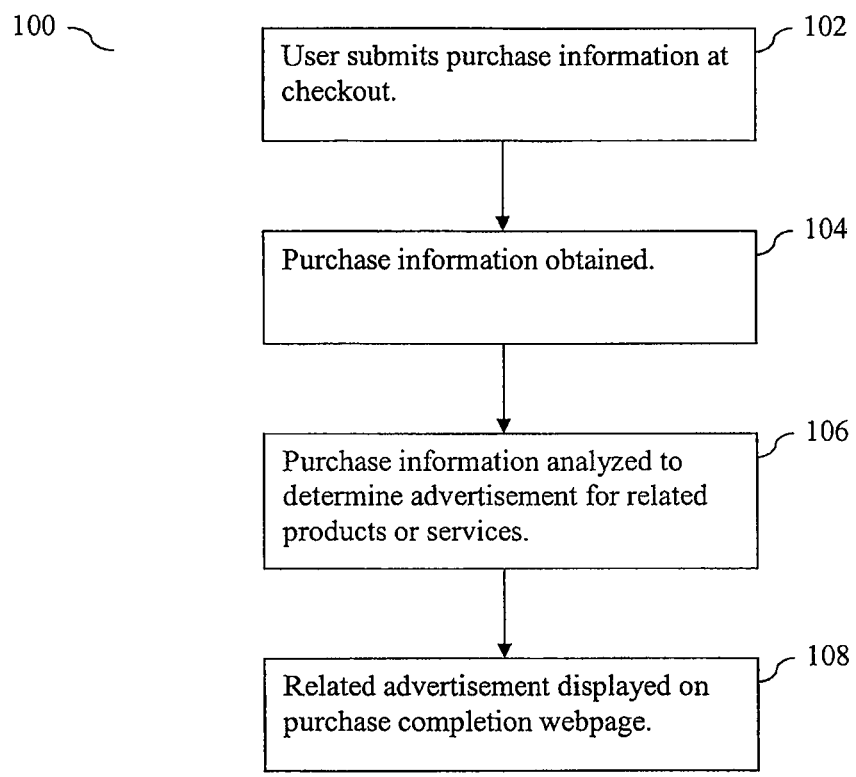
FIG. 1 shows a flowchart illustrating a method for providing advertisements, according to an embodiment of the present invention.

Retailers wish to place their advertisements in opportune times and places. Some opportunities can be highly valuable for an advertiser. For example, targeted advertisements can be more effective and cost efficient when displayed at the time, or immediately after, a user has acted on a decision to purchase and is waiting for a confirmation message. The act performed may be the submission of information at checkout. Rather than displaying advertisements for goods or services similar to the good or service just purchased, it may be useful to the user to display advertisements for goods or services that are related to and/or complementary to the good or service just purchased. The user is more likely to purchase a related or complementary good or service than a similar good or service, since there is no need for a good or service similar to that just purchased. Further, it is likely that the related or complementary good or service will be highly relevant to the user, since the user was interested enough to complete a purchase for the purchased good or service. FIG. 1 shows an exemplary method 100 for providing an advertisement relevant to a purchase on a website at the point of checkout, according to an embodiment of the present invention. In stage 102, a user submits purchase information at checkout.

Purchase information may include but is not limited to information about the product(s) or service(s), the cost of the product(s), the amount the user paid, the location of the user, personal and financial information, the behavior of the user on the website, products selected and removed before checkout, or any other information that could be used to determine a relevant advertisement.

Checkout is a term used to describe the stage of online shopping when a user agrees to pay for selected items or services. This stage may include placing an order or completing payment. This stage may also include situations in which a user registers for a product or service that will be paid for at a later time, place or date. This stage is not limited to only what may be labeled by the website as "checkout" but includes any stage where the consumer is acting on the decision to purchase a product or service. This act may include the submission of purchase information.

The submission of purchase information usually takes place by the user selecting a submission link, which may have various other labels or presentations, such as "submit" or "confirm". As used herein, the term "link" refers to any kind of link, button, selector, or other type of user interface control element for connecting to an application and/or executing an action from a given location.

The webpage at this stage may be described as a landing page or confirmation page where a user is given a chance to review the final product information and to verify that the user's credit card, online payment information, or other financial information is correct. Such information may or may not be displayed with the submission link. Also, the user may or may not review the information before submitting or confirming it. The submission of purchase information may indicate the point in time where no other action is required by the user to make the purchase. At this time, the user may be expecting a purchase completion message on a purchase completion screen. This is the most opportune time to display an advertisement relative to the user. The user has finished making a purchase (so that the purchase cannot be lost), is still familiar with reasons for making the recent purchase, and has not yet navigated away from the purchase completion screen. Because this is the most opportune time, the timing of the ad display is important.

There may be multiple steps, webpages, or even websites involved in the submission of purchase information. A user may be transferred to another webpage or website after selecting the purchase but before proceeding to checkout. The user may be transferred to another webpage or website before, during, or after the purchase confirmation screen is displayed. The user may select a purchase on one website and then submit the purchase information on a second or intermediary website. It is also possible for the user to be transferred, even temporarily, to another webpage or website for purposes of entering financial, shipping, or preference information. As would be appreciated by those skilled in the relevant art(s), the submission of purchase information by the user may be performed in other ways without departing from the scope and spirit of the invention.

In a subsequent stage 104 of the exemplary method 100, the purchase information is obtained. The obtaining of purchase information may be automated or carried out through the use of hardware, software, firmware, or any combination thereof. The purchase information can be obtained through use of a data feed, a computer network, any combination of computer networks, or through the use of one or more servers.

In another subsequent stage 106 of the exemplary method 100, the purchase information is analyzed to determine advertisements for products or services that are related and/or complementary to the product or service purchased. Other information may be added to the analysis. This analysis may include comparing the purchase information to comparative information. This comparative information may be obtained by observing the user or the user's actions on the website. Comparative information may also be information previously, currently, or dynamically obtained from another source, database, or party.

The comparative information may include, but is not limited to, information about follow-on-purchase keyword purchases, keyword-advertisement relationship information, aggregated information from purchase or checkout histories, website search information, one or more personalized search histories, index word proximity information for one or more websites, retailer advertisement bidding information, product search clustering information, content of the landing or confirmation page during checkout, click-through rates of advertising over time, or keyword information provided by a third party. Comparative information can also include purchase information from other users or from previous purchases by the same user. As would be appreciated by those skilled in the relevant art(s), the purchase information and comparative information may include other types of information without departing from the scope and spirit of the invention.

As used herein, a follow-on-purchase keyword is a keyword identifying a product that is used as a trigger for an advertisement. A follow-on-purchase keyword may be associated with a given advertisement to indicate that the given advertisement should be displayed once a product associated with the keyword has been purchased. Keyword-advertisment relationship information includes search keyword information tracked, linked, or related to advertisements that were displayed or measured for their level of success in attracting commercial activity. Aggregated information from purchase or checkout histories includes information obtained from observing shopping cart and checkout behavior as well as information about the products selected, removed, or purchased. The histories may have been developed by the retailer or provided by third parties. This information may be stripped of individual identifying information.

As used herein, index word proximity information refers to the relationship a word may have with another word based upon their proximity to each other in search queries or search results. The words and their relationships may be indexed, stored, or mapped. Retailer advertisement bidding information is information obtained from observing the behavior of retailers that are bidding for advertisement placement. This information may also include the types of advertisements, the content of the advertisements, related keywords, amounts paid for advertisements at different points in time, and the activity of one advertiser as compared to another advertiser. Advertisers may bid on follow-on-purchase keywords rather than or in addition to search-term keywords. For instance, advertisers may purchase keywords for electronic devices that are compatible with a specific battery. Product search clustering information may include information about products grouped, classified or clustered together based on similar characteristics or tendencies. Clustering may also involve classifying products based on typical groupings provided by search results. As would be appreciated by those skilled in the relevant art(s), comparative information may be created or obtained in other ways without departing from the scope and spirit of the invention.

Comparing the purchase information to comparative information is one of many other ways that the analysis may be performed by human or artificial intelligence. New or existing logic may be used to analyze the purchase information to determine an advertisement that would be best suited for the user and the advertising retailer. As would be appreciated by those skilled in the relevant art(s), the analysis may be performed in other ways without departing from the scope and spirit of the invention.

As shown in analysis stage 106, the purchase information is analyzed to select one or more advertisements for products or services that are complementary and/or related to the purchased product or service. The advertisement for a complementary and/or related product or service may be selected based on a type of product or service included in the advertisement. That is, rather than selecting for display an advertisement for a similar type of product or service, an advertisement for a different type of product or service that is related in some way to the product or service purchased may be selected for display. For example, books are of a different type of product than flight information. A user may purchase a book about visiting India. Upon purchase, existing websites may show similar books about visiting India, chosen by previous purchasers of the selected book. In these instances, the purchased India travel book is of the same type as the displayed similar books about visiting India. In an embodiment of the present invention, however, such a purchase may result in a display of an advertisement for a good or service that is of a different type of product or service than that of the book. For example, a purchase of a book about visiting India may result in the display of an advertisement for flights or hotels in India.

Similarly, the type of the purchase may be related but not directly categorized with the type of the product or service advertised. For example, glucosamine, a supplement that is used in the treatment of osteoarthritis, can be directly categorized with other amino acids, vitamins or supplements used to treat osteoarthritis. Glucosamine may be related and possibly categorized with vitamins and supplements generally, but not directly categorized with them. Glucosamine is related to physical therapy but not directly categorized with physical therapy. In typical advertisement systems, a purchase of glucosamine does not result in physical therapist advertisements. However, according to an embodiment of the present invention, since glucosamine is related to physical therapy, a physical therapy advertisement may be displayed when glucosamine is purchased.

The type of product or service associated with an advertisement may be specified, for example, in the keywords associated with the advertisement. Alternatively, advertisements having certain keywords may automatically be sorted into various product or service types based on the keywords associated with the advertisement. Additionally or alternatively, categorization and the definition of categories may take place before, during or after the submission of the purchase information. For example, categorization may take place on the fly and be used in a determination of a related advertisement. In another example, categorization may take place during or after the user submits the purchase information and before the at least one advertisement is displayed.

Different combinations of products and services may be found to be most beneficial to advertisers. If a good is advertised, the type of good may be related to but not directly categorized with a type of the service purchased. Similarly, if a service is advertised, the service type may be related to but not directly categorized with a type of good purchased. The product or service purchased and the product or service advertised may both be products or both be services. In some embodiments, the advertised product or service may be something other than the actual product or service purchased or a substitute thereof.

Other examples of products and services that are related but not directly categorized together include, for example and without limitation, a software book and an advertisement for a software training class; a digital camera and an advertisement for photo editing software; dress shirts and an advertisement for local dry cleaning services; and a book about weight loss and an advertisement for nutritionists.

The selection of a related advertisement, according to different embodiments of the present invention, may include selecting advertisements of varying relation to the product or service purchased. This selection is not precluded from selecting for display an advertisement of a product type that is, in fact, both related and directly or indirectly categorized with the type of product or service purchased. However, advertisers may find certain advertisements more effective than others.

At another subsequent stage 108 of the exemplary method 100, the related advertisement may be displayed on a purchase completion screen with a purchase completion message that confirms that the sale has been completed. The user often waits for this purchase completion screen in order to be satisfied that the payment was received, there was enough money or credit to his or her name, that the item or service appears to be available, and/or that there is no further action required by the user in order to receive the product or service purchased.

At this point the user may still be considering other products or services related to the overall experience to which the purchased product or service will contribute. The user may or may not be aware of highly relevant products or services that may complement the purchase and enhance a future user experience. This highly valuable point in time may be combined with the purchase information to display the related advertisement on the purchase completion page. This advertisement may be of any form or on any location on the screen. It is also possible for there to be intervening screens on which to display the advertisements. The user may be transferred to another webpage or website before, during, or after the purchase completion screen.

Figure 2:
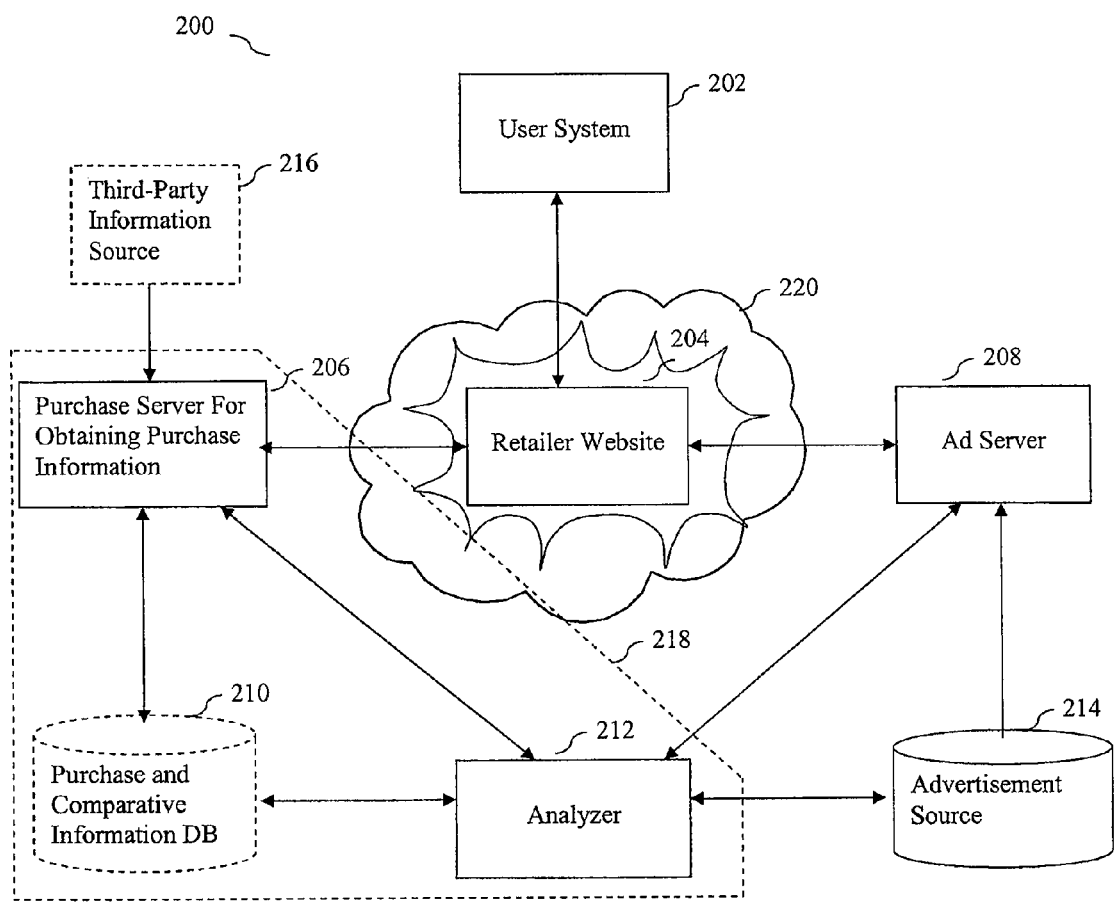
FIG. 2 illustrates a system for providing advertisements, according to an embodiment of the present invention.

FIG. 2 illustrates a system for displaying advertisements on a website, according to an embodiment of the invention. System 200 includes a purchase server 206, an advertisement source 214, and an advertisement server 208 coupled to an analyzer 212. System 200 may also include a user system 202, a retailer website 204 and a purchase and comparative information database 210. Purchase server 206, user system 202 and ad server 208 may be coupled to a retailer website 204. The connections may be direct or indirect, such as over a network 220.

User system 202 is configured to allow a user to access the Internet or another communication network. A user may visit one or more websites through user system 202. In visiting retailer website 204, user system 202 may request retailer website 204 from a server. This server may or may not be under retailer control. In response to the request, retailer website 204 may be downloaded and displayed on user system 202. An advertisement may be displayed on user system 202 when retailer website 204 is displayed. The advertisement may be embedded within the website or otherwise displayed. In another embodiment, retailer website 204 may be a website managed by a third party who acts on behalf of the retailer.

Ad server 208 is configured to provide advertisements to one or more retailer websites 204 that one or more users are visiting. In an embodiment, ad server 208 may be configured to operate as a website server and service requests for websites from user system 102. Ad server 208 may be configured to receive purchase and comparative information and to transmit the purchase and comparative information to purchase server 206, analyzer 212, or purchase and comparative information database 210.

Advertisement source 214 is configured to store advertisements that will be displayed on websites, such as retailer website 204. Advertisements may be stored with descriptive information used by analyzer 212 and ad server 208. Advertisement source 214 may be a database, a data feed, or another device that assembles or creates advertisements in real-time from one or many sources.

Purchase and comparative information is stored in purchase and comparative database 210. Purchase and comparative information database 210 may be coupled to purchase server 206 and analyzer 212. The purchase and comparative information may be obtained from retailer website 204 or a third party information source 216 through purchase server 206. This information may be obtained or provided through the use of a data feed or any other means for transmitting data. This information may also be directly obtained by or provided to analyzer 212. In embodiments of system 200, any combination of purchase server 206, analyzer 212, or purchase and comparative information database 210 may reside in one computer 218.

According to an exemplary embodiment of system 200, retailer website 204 is coupled to purchase server 206, user system 202 and ad server 208 through network 220. Network 220 may be any network or combination of networks that can carry data communication, and may be referred to herein as a computer network. Such network 220 may include, but is not limited to, a local area network, medium area network, and/or wide area network such as the Internet. Network 220 may support protocols and technology including, but not limited to, World Wide Web protocols and/or services. Intermediate web servers, gateways, or other servers may be provided between components of system 200 depending upon a particular application or environment.

According to an embodiment of the present invention, retailer website 204 is replaced by a second website that handles checkout. In such a case, retailer website 204 and the second website are coupled together either through network 220 or by another communication means. This embodiment does not preclude the possibility that ad server 208, advertisement source 214 and possibly retailer website 204 may reside on the same computer.

Analyzer 212 is configured to analyze purchase information alone or in combination with comparative information, as in embodiments described above. In an embodiment, analyzer 212 receives user purchase information from purchase server 206 and comparative information from purchase and comparative information database 210. In another embodiment, analyzer 212 may receive user purchase information through purchase and comparative information database 210. Analyzer 212 may also receive advertisement descriptive information from advertisement source 214 or ad server 208.

Information received by analyzer 212 may be used to determine at least one advertisement for a product or service based upon the purchase information, as described above. In the many embodiments described herein, analyzer 212 may be configured or programmed to receive the user purchase information, perform the analysis to determine an advertisement, and ensure that ad server 208 delivers the selected advertisement to retailer website 204 or any other website. In an embodiment, this sequence of events is performed between the approximate time a user submits the purchase information at the confirmation screen and the approximate time the user receives a purchase completion message.

Figure 3:
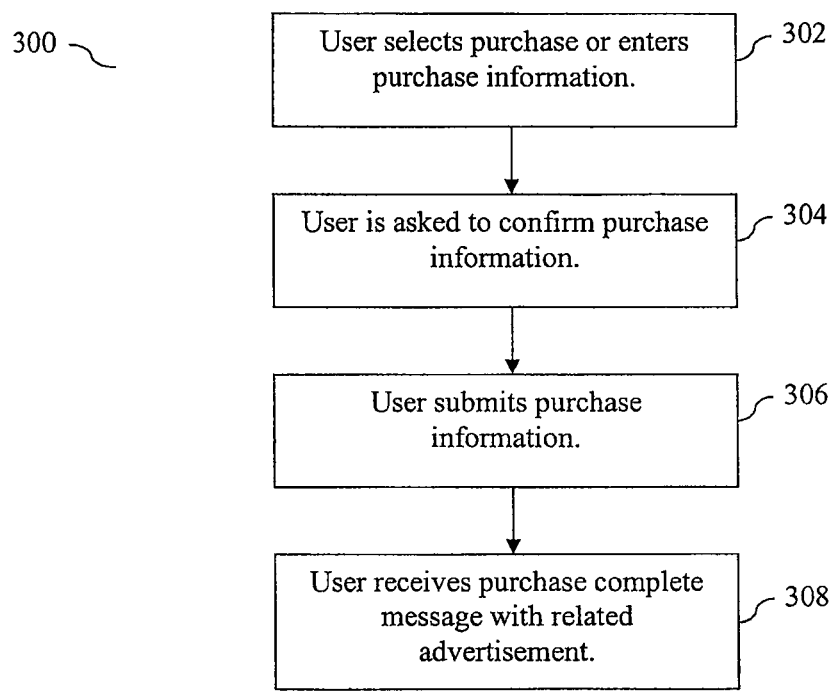
FIG. 3 shows a flowchart illustrating a user experience related to a method for providing advertisements, according to an embodiment of the present invention.
Figure 5:
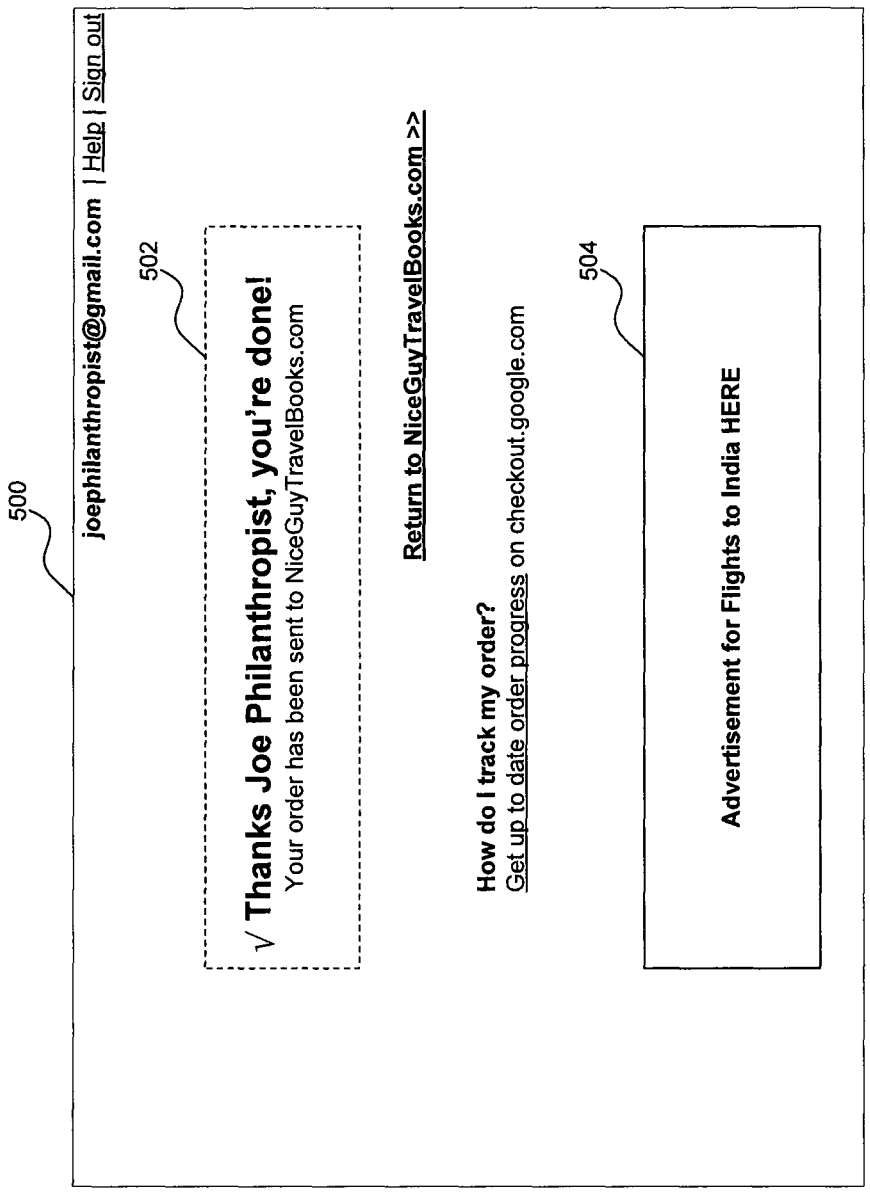

According to an embodiment, FIGS. 3, 4 and 5 show, respectively, an exemplary process 300 of a user making an online purchase, an exemplary confirmation screen 400, and an exemplary completion screen 500, according to embodiments of the present invention. The confirmation screen 400 and completion screen 500 are shown for purposes of example and may represent screens provided by the retailer website or other third party websites. In the first stage 302 of process 300, a user enters purchase information, such as purchase information 402 of FIG. 4. Alternatively, a user may select a purchase and then purchase information 402 is generated or collected based on previously obtained information. Such previously obtained information may be, for example and without limitation, stored credit card information and shipping preferences entered from a previous purchase on retailer website 204 or on another website.

In the next stage 304 of process 300, the user is asked to confirm the purchase information and/or to confirm the purchase selection if the retailer has been pre-authorized to place the order. The user may be presented with some combination of information to be verified. The user may be asked to perform a certain task that will place the order with the retailer. This may include but is not limited to selecting a submission link, such as link 404.

In stage 306 of process 300, the user submits the purchase information. The user may await a final completion message, such as completion message 502 of FIG. 5, stating that the order has been placed or sent to the retailer. In another embodiment, stages 302 and 304 may be combined into one action, as in "one-click" shopping. As would be appreciated by those skilled in the relevant art(s), the submission of purchase information may be performed in other ways without departing from the scope and spirit of the invention.

In the next stage 308 of the exemplary embodiment, the user receives the purchase completion message 502 with a selected advertisement 504. It is possible that no completion message will be given or that a completion message 502 will be in the form of advertisement 504 itself. The advertisement is related to the product or service purchased, as previously described herein. In another embodiment, the user may be shown videos or other advertisements before or after the purchase completion screen. In a further embodiment, a user or merchant may be enabled to tie together the purchase and a subsequent purchase based on the related advertisement for convenience in shipping or payment. As would be appreciated by those skilled in the relevant art(s), stage 308 may be performed in other ways without departing from the scope and spirit of the invention.

Aspects of the present invention, for example method 100 and/or system 200 or any part(s) or function(s) thereof may be implemented using hardware, software, firmware, or a combination thereof and may be implemented in one or more computer systems or other processing systems.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer-implemented method for providing advertising on a website, comprising:
    obtaining purchase information submitted by a user acting to make a purchase on the website, wherein the purchase information includes information about a product or service that the user has acted on to purchase and is obtained at a point in time after checkout and prior to a purchase confirmation message being provided for display to the user;
    using the purchase information of the purchase, determining, by one or more computer systems, at least one advertisement for an unpurchased product or service related to the product or service that the user has acted on to purchase and having a different type than the product or service that the user has acted on to purchase, wherein the determining the at least one advertisement comprises comparing the purchase information to previous purchases made at the website or at third-party websites; and
    providing the at least one advertisement for display on the website to the user when the purchase confirmation message is presented to the user.

2. The computer-implemented method of claim 1, wherein the at least one advertisement is at least one of a text advertisement, an image advertisement, a video advertisement, an audio advertisement, a multimedia advertisement, or an interactive advertisement.

3. The computer-implemented method of claim 1, wherein the type of the product or service in the at least one advertisement is related to but not directly categorized with the type of the product or service that the user has acted on to purchase.

4. The computer-implemented method of claim 3, wherein the product or service in the at least one advertisement is a good and the purchase is for a service.

5. The computer-implemented method of claim 3, wherein the product or service in the at least one advertisement is a service and the purchase is for a good.

6. The method of claim 3, wherein categorization of the type of product or service that the user has acted on to purchase is performed after the user submits the purchase information and before the at least one advertisement is displayed, and wherein the categorization is used for determining the at least one advertisement.

7. The computer-implemented method of claim 1, wherein the display of the at least one advertisement occurs immediately after the user submits the purchase information and before the user leaves a purchase completion webpage.

8. The computer-implemented method of claim 1, wherein the determining the at least one advertisement further comprises comparing the purchase information to keyword-advertisement relationship information.

9. The computer-implemented method of claim 1, wherein the determining the at least one advertisement further comprises comparing the purchase information to website search information.

10. The computer-implemented method of claim 1, wherein the determining the at least one advertisement further comprises comparing the purchase information to at least one personalized search history.

11. The computer-implemented method of claim 1, wherein the determining the at least one advertisement further comprises comparing the purchase information to index word proximity information for at least one website.

12. The computer-implemented method of claim 1, wherein the determining the at least one advertisement further comprises comparing the purchase information to retailer advertisement bidding information.

13. The computer-implemented method of claim 1, wherein the determining the at least one advertisement further comprises comparing the purchase information to product search clustering information.

14. The computer-implemented method of claim 1, wherein the determining the at least one advertisement further comprises comparing the purchase information to content of a landing or confirmation page during checkout.

15. The computer-implemented method of claim 1, wherein the determining the at least one advertisement further comprises comparing the purchase information to keyword information provided by a third party.

16. The computer-implemented method of claim 1, wherein the purchase and a second purchase resulting from the displayed advertisement are tied together for convenience in at least one of shipping and payment.

17. A system for providing advertising on a website, comprising:
    a purchase server that obtains purchase information submitted by a user acting to make a purchase on the website, wherein the purchase information includes information about a product or service that the user has acted on to purchase and is obtained at a point in time after checkout and prior to a purchase confirmation message being provided for display to the user;
    an advertisement source;
    an analyzer that determines at least one advertisement for an unpurchased product or service based upon the purchase information of the purchase, wherein the product or service is related to the product or service that the user has acted on to purchase but is of a different type than the product or service that the user has acted on to purchase; and
    an advertisement server that serves the at least one advertisement from the advertisement source for display on the website to the user when the purchase confirmation message is presented to the user.

18. The system of claim 17, wherein the type of the product or service in the at least one advertisement is related to but not directly categorized with the type of the product or service that the user has acted on to purchase.

19. The system of claim 17, further comprising a purchase and comparative information database configured to store at least one of purchase or comparative information obtained from at least one of the purchase server or a feed.

20. The system of claim 19, wherein the analyzer is configured to receive at least one of purchase information, comparative information, or advertisement information from a third party.

21. The system of claim 17, wherein the website comprises a second website that is connected to the website and used for checkout, and the at least one advertisement is displayed on the second website.

22. The system of claim 17, wherein the display of the at least one advertisement occurs immediately after the user submits the purchase information and before the user leaves a purchase completion webpage.

23. A computer-implemented method for providing advertising on a website, comprising:
- obtaining purchase information submitted by a user acting to make a purchase on the website, wherein the purchase information includes information about a product or service that the user has acted on to purchase and is obtained at a point in time at checkout and prior to a purchase confirmation message being provided for display to the user;
- using the purchase information of the purchase, determining, by one or more computer systems, at least one advertisement for an unpurchased product or service related to the product or service that the user has acted on to purchase and having a different type than the product or service that the user has acted on to purchase, wherein the determining the at least one advertisement further comprises comparing the purchase information to follow-on-purchase keyword purchases; and
- providing the at least one advertisement for display on the website to the user when the purchase confirmation message is presented to the user.

24. A computer-implemented method for providing advertising on a website, comprising:
- obtaining purchase information submitted by a user acting to make a purchase on the website, wherein the purchase information includes information about a product or service that the user has acted on to purchase and is obtained at a point in time after checkout and prior to a purchase confirmation message being provided for display to the user;
- using the purchase information of the purchase, determining, by one or more computer systems, at least one advertisement for an unpurchased product or service related to the product or service that the user has acted on to purchase and having a different type than the product or service that the user has acted on to purchase, wherein the determining the at least one advertisement further comprises comparing the purchase information to aggregated information from purchase or checkout histories; and
- providing the at least one advertisement for display on the website when the purchase confirmation message is presented to the user.

* * * * *